Jan. 3, 1956 J. W. FORREST 2,729,137
REFRACTOMETER WITH LINEAR SCALE
Filed Dec. 27, 1954
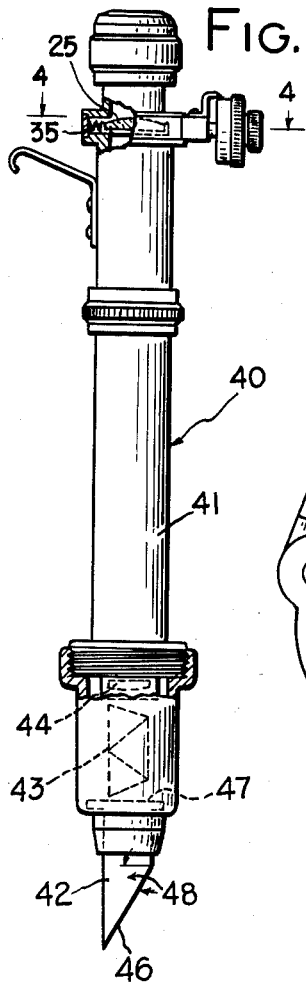
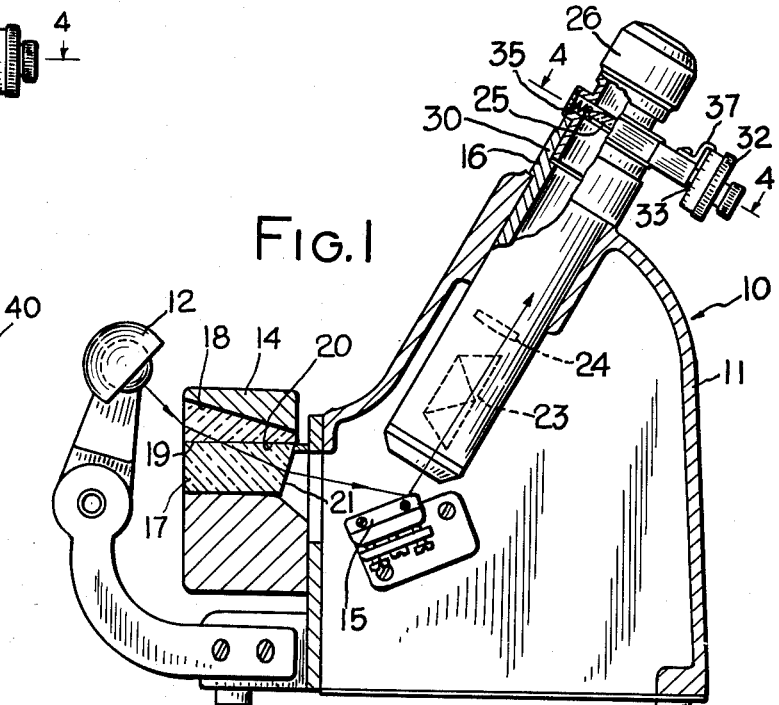
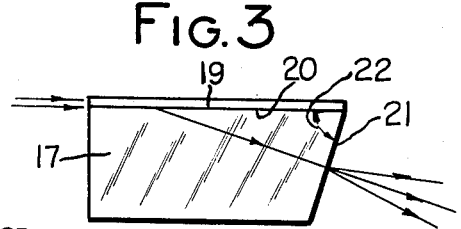
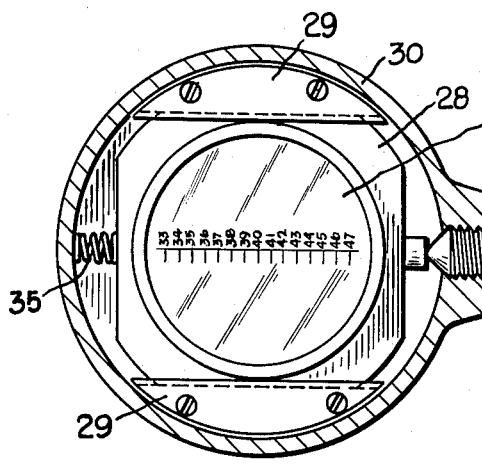
INVENTOR.
JOHN W. FORREST
BY
*G. A. Ellestad*
*W. E. Recktenwald*
ATTORNEYS United States Patent Office 2,729,137
Patented Jan. 3, 1956

2,729,137

REFRACTOMETER WITH LINEAR SCALE

John W. Forrest, Brighton, N. Y., assignor to Bausch & Lomb Optical Company, Rochester, N. Y., a corporation of New York Application December 27, 1954, Serial No. 477,761

5 Claims. (Cl. 88—14)

This invention relates to refractometers and more particularly to a critical angle refractometer.

Critical angle refractometers have generally been designed along two lines namely, either with a non-linear scale in which the reading of the final figure of the index value is estimated, or with a linear scale in which an arbitrary reading of the scale is converted to an index value by reference to a non-linear chart. The first type is best illustrated by the standard Abbe instrument which, broadly speaking, has an index prism and a telescope moved relative to one another until the borderline of total reflection produced by a sample under examination is focused on a reference target in the telescope. The angular position of the prism relative to the telescope determines the index of refraction of the sample which is read to the fourth decimal place by estimation on a non-linear scale divided to the third place.

The second type of instrument, in which a linear scale is calibrated in arbitrary units that must be converted to index values, is illustrated by the dipping or immersion type refractometer which has an index prism and a telescope rigidly mounted relative to each other. A scale in the ocular of the telescope is read directly at that position where the image of the borderline of total reflection of the sample falls. The scale is movable laterally one scale division by a micrometer drum to more accurately align the borderline with a scale division. The scale is calibrated in arbitrary linear values which must be converted to index values by reference to a non-linear conversion chart supplied with each instrument. The dipping or immersion type refractometer, with the micrometer drum, is capable of being read to within a few units of the fifth decimal place.

Although refractometers of the first type have a substantially complete and wide range of refractive indices ($n_D = 1.3$ to $1.7$), the measuring accuracy is necessarily limited due to the deficiencies of the mechanical parts, such as bearings, levers, etc. Refractometers of the second type have a high degree of accuracy, but are necessarily limited by the nature of the instrument to a very short range of refractive indices. To overcome this deficiency in current instruments of the second type, a series of prisms is provided which when individually inserted in the instrument and calibrated will, by the combined effect, provide an instrument with a substantially full range of indices. This system is generally undesirable, inconvenient and expensive. Another instrument of the second type on the market provides a plurality of juxtaposed prisms, each capable of indicating a short range of indices, the combined effect being a complete range of indices. However, this last-named instrument is expensive to build, delicate to maintain and less accurate in use.

As is well known in the art, any instrument that requires an operator to exercise judgment with respect to estimating the position of a borderline of total reflection between two scale lines is subject to inaccuracies. Since instruments of the first type (Abbe) require such an estimation on a non-linear scale, the resulting accuracy is not sufficient for all intended purposes. Likewise, instruments of the second type (dipping) are very limited in the range of indices capable of being read thereon, the readings being made on an arbitrary linear scale that must be converted to index values on a separate conversion chart. Since the instruments of the second type are not directly readable and are limited in range of indices, they are not satisfactory for general overall usage.

Therefore, instruments on the market today are either read directly from a non-linear scale or are read directly from a linear scale which reading is then converted to index values. In view of the objections to these present-day refractometers, it has been the desire of the manufacturers of refractometers to design a complete self-contained instrument that embodies a linear, direct reading scale having a comparatively high degree of accuracy over a relatively wide range of indices.

It is, therefore, an object of this invention to provide an improved refractometer having a dipping type scale that overcomes the above-noted disadvantages of the prior art.

It is another object of this invention to provide an improved refractometer having a direct reading, linear scale.

It is a further object of this invention to provide a refractometer having a comparatively wide range of refractive indices.

It is another object of this invention to provide a refractometer that is complete and self-contained having few moving parts.

And a still further object of this invention is to provide a refractometer of simple construction and operation, which may not only be economically manufactured, but which will be efficient in use, uniform in operation, and be unlikely to get out of repair.

These and other objects and advantages reside in certain novel features of construction, arrangement and combination of parts as will hereinafter be more fully explained and pointed out in the appended claims.

Referring to the drawings:

Fig. 1 is a fragmentary side view, partly in section, of a refractometer embodying a preferred form of my invention.

Fig. 2 is a side view, partly in section, of another type of refractometer embodying my invention.

Fig. 3 is a side view of the prism shown in Fig. 1.

Fig. 4 is a sectional view taken on the line 4—4 in Figs. 1 and 2.

Referring to Fig. 1 of the drawing in detail, a refractometer 10, having a dipping type scale, comprises a housing 11 supporting in optical alignment a light source 12, a prism system 14, a mirror 15 and a telescope 16, the relationship of said parts to each other being conventional.

The prism system 14 comprises a lower prism 17 which is carried by the front of the housing and an upper prism 18 pivotally mounted on the housing so as to be pivoted away from the lower prism for loading a sample 19 thereon. Said lower prism 17 has a refracting surface 20 upon which a sample to be tested is placed and an emerging surface 21 facing into an opening in the housing. Said emerging surface 21 is disposed at an angle 22 with respect to said refracting surface 20, said angle 22 being referred to hereinafter as the prism refracting angle.

When a light ray forming the borderline of total reflection of a sample 19 enters the prism at the refracting surface 20, it is refracted, and as it leaves through the emerging surface 21 it is again refracted, the total refraction depending upon the refractive index of the sample 19, the refractive index of the prism 17 and the refracting angle 22.

The refracted rays pass to the mirror 15 where they are reflected through the achromatization system 23 and objective 24 which serve the purpose of forming an image of the borderline of total reflection on the scale 25, where the position of said borderline in scale divisions may be read.

The scale 25, as best illustrated in Fig. 4, is mounted in the optical path of the eyepiece 26 of the telescope 16 by means of a frame 28 laterally slidable in a pair of guide plates 29 mounted in the tube 30 of the telescope 16. A micrometer drum 32 has a shaft 33 which is threaded into the side of said tube 30 and bears against one side of the frame 28 in opposition to a compression spring 35 bearing against the opposite side of said frame. The pitch of the threads 36 on the shaft 33 is such that a partial rotation of the micrometer drum 32 will advance the scale 25 one scale division across the optical path of the light rays. A pointer 37 is carried by the tube 30 of the telescope 16 in cooperating relationship with calibrations on the micrometer drum 32 for indicating the amount of movement given to the scale 25.

Referring to Fig. 2 of the drawing, another refractometer 40 having a dipping type scale comprises an elongated tubular housing 41 having a prism 42 with an achromatization system 43 and an objective 44 for forming an image of the borderline of total reflection on the scale 25 in the telescope end of the instrument. The scale 25 and associated operating parts thereof are the same as that shown and described with reference to Figs. 1 and 4.

The prism 42 has a refracting surface 46 and an emerging surface 47 so positioned that a refracting angle 48 is formed between the refracting surface 46 and a plane lying parallel to the emerging surface 47 and intersecting the plane of the refracting surface 46.

The prism 17, which is the equivalent of the prism 42, is optically designed in such a way that the scale 25 can be laid out with equally spaced linear divisions that are directly readable in index of refraction values. This is accomplished by making the refracting prism 17 of a glass having a comparatively high index of refraction which, together with the required range of indices of refraction to be read, is balanced against the refracting angle of the prism to produce a system whereby the extreme rays of the required range are symmetrically spaced about the median ray. With the extreme rays symmetrically spaced about the median ray, all the intermediate refracted rays will fall into place.

For each range of refractive indices, prism index of refraction, and prism refracting angle, there will be an error curve which can be computed. The "error curve" is a curve that is computed to show the deviation of each index of refraction light ray from its true angular position. For instance, when a refracted ray from a sample of a specific index of refraction value is traced through the system and back on itself, using Snell's law, the final computed value of the ray should not deviate from the actual value by an amount in excess of plus or minus one in the fourth place. When the error curve for a range of refractive indices falls within the allowable limits, a scale 25 laid out with equally spaced linear divisions will be adapted to be read to an accuracy of one in the fourth decimal place.

It has been found that glass having a refractive index between 1.75 and 2.00 will produce a prism that has a sufficiently wide range of index of refraction values to cover substantially all of the various industrial requirements. With the indices of refraction of the prism lying between 1.75 and 2.00, the refracting angle of the prism 22 will be included in the range of angles between 60 and 70 degrees.

As an example of one specific embodiment of my invention, a glass having an index of refraction of 1.88 is used to manufacture the prism 17. For a range of indices of refraction between 1.33 and 1.47, a prism angle of 65° 10′ will produce a prism that has the extreme rays 1.33 and 1.47 symmetrically spaced about the median refracted ray 1.40. In this way, a scale 25 can be laid out in equally spaced increments of refractive index. The micrometer drum 32 is calibrated so that a partial turn of the drum will shift the scale 25 one full scale increment. The micrometer drum 32 is divided into units making it possible to secure readings of refractive index directly to one in the fourth place.

A range of refractive indices from 1.33 to 1.47 is equivalent to a "per cent total solids" range from 0% to 72% which covers almost the complete range of food industry requirements with a self-contained, single instrument that is directly readable and highly accurate. To provide an equivalent range that is slightly less accurate on other current instruments would require three separate prisms each with a different index of refraction and/or different prism refracting angles, plus the added inconvenience of being required to convert the readings from the arbitrary scale reading to index of refraction values.

As another example of a specific embodiment of my invention, a glass having an index of refraction of 1.88 for a range of readings from 1.44 to 1.53 will have a prism refracting angle of 70° 10′ to permit a linear, direct reading scale to be used.

It has been found that prisms made from glass having indices of refraction between 1.75 and 2.00 and prism refracting angles between 60° and 70° will provide instruments with ranges of possible readings far greater than previous instruments. The new instrument with its prism will have a linear scale that is calibrated directly in index of refraction values that can be read with substantially greater accuracies than the best Abbe type instruments on the market today but with far greater convenience.

From the foregoing, it may be observed that I have attained the aims and objects of my invention in that I have provided an improved refractometer that has a direct reading linear scale having a comparatively high degree of reading accuracy over a relatively wide range of index of refraction values. The instrument is compact, efficient and easily operated having but few operating parts.

Although but certain embodiments of this invention have been shown and described in detail, it will be understood that other embodiments are possible and changes may be made in the form and arrangement of parts and substitutions may be made therein without departing from the spirit of the invention as defined in the appended claims.

I claim:

1. In a refractometer the combination of a housing, a refracting prism mounted in an opening in said housing and having an exposed horizontally positioned refracting surface thereon for receiving a sample to be tested, said prism having an emerging surface disposed at an angle with respect to said refracting surface from which the refracted rays from the refracting surface emerge, said angle having a magnitude within the range of 60 to 70 degrees, said prism being made of glass having a refractive index between 1.75 and 2.0, the relation between the index of refraction of the glass and said angle being such that the upper and lower extreme rays refracted by the prism will fall symmetrically about the median ray refracted by the prism, a viewing means having an eyepiece projecting from said housing in optical alignment with the rays refracted from said prism, and a scale mounted in the eyepiece of the telescope in optical alignment with the rays refracted by the prism, said scale being divided into substantially equally spaced divisions that are calibrated in an appropriate refractometric scale, whereby the borderline of total reflection produced by the sample on the refracting surface of the prism may be read directly from the scale.

2. In a refractometer the combination of a housing, a refracting prism mounted in an opening in said housing and having an exposed refracting surface for contact with a sample to be tested, said prism having an emerging surface facing the inside of said housing and disposed at an angle with respect to said refracting surface, said angle having a magnitude within the range of 60 to 70 degrees, said prism being made of glass having a refractive index ranging between 1.75 and 2.0, the relation between said angle and the refractive index of the glass of said prism being such that the upper and lower extreme rays refracted by the prism will be symmetrically spaced about the median ray refracted by the prism, viewing means having an eyepiece and a laterally shiftable scale in optical alignment with said prism, said scale being divided into substantially equally spaced divisions, each division representing equal increments of a refractometric scale, and a micrometer drum operatively connected to said scale for laterally shifting said scale across the optical path of the viewing means, said drum being calibrated so that a partial turn of the drum will shift the scale one scale division whereby the refractive index of the sample in contact with the refracting surface may be read directly from the scale.

3. In a refractometer the combination of a housing, a refracting prism mounted in an opening in said housing and having an exposed refracting surface for contact with a sample to be tested, said prism having an emerging surface facing the inside of said housing and disposed at an angle with respect to said refracting surface, said angle having a magnitude of about 65° 10′, said prism being made of glass having a refractive index of about 1.88, the relation between said angle and the refractive index of the glass of said prism being such that the upper and lower extreme rays refracted by the prism will be symmetrically spaced about the median ray refracted by the prism, viewing means having an eyepiece and a laterally shiftable scale in optical alignment with said prism, said scale covering a range of refractive indices from about 1.33 to 1.47 divided into equally spaced increments, and a micrometer drum operatively connected to said scale for laterally shifting said scale across the optical path of the viewing means, said drum being calibrated so that a partial turn will shift the scale laterally substantially one scale increment whereby the refractive index of the sample in contact with the refracting surface may be read directly from the scale.

4. In a refractometer having a housing and a viewing means carried by said housing for receiving light rays from a refracting prism carried by said housing the combination of the refracting prism having an exposed refracting surface thereon for contacting a sample to be tested, said prism having an emerging surface formed at an angle with respect to said refracting surface from which the refracted rays from the refracting surface emerge, said angle having a magnitude within the range of 60 to 70 degrees, said prism being made of glass having a refractive index between 1.75 and 2.0, the relation between the index of refraction of the glass and said angle being such that the upper and lower extreme rays refracted by the prism will fall symmetrically about the median ray refracted by the prism, and a scale mounted in the viewing means in optical alignment with the rays refracted by the prism, said scale being divided into substantially equally spaced divisions that are calibrated in an appropriate refractometric scale, whereby the borderline of total reflection produced by the sample in contact with the refracting surface of the prism may be read directly from the scale.

5. In a refractometer having a housing, and a telescope carried by the housing for receiving light rays refracted from a refracting prism mounted in an opening in said housing the combination of said refracting prism having an exposed refracting surface for contact with a sample to be tested, said prism having an emerging surface facing the inside of said housing and disposed at an angle with respect to said refracting surface, said angle having a magnitude within the range of 60 to 70 degrees, said prism being made of glass having a refractive index ranging between 1.75 and 2.0, the relation between said angle and the refractive index of the glass of said prism being such that the upper and lower extreme rays refracted by the prism will be symmetrically spaced about the median ray refracted by the prism, said telescope having an eyepiece and a laterally shiftable scale in optical alignment with said prism, said scale being divided into substantially equally spaced divisions, each division representing equal increments of a refractometric scale, and a micrometer drum operatively connected to said scale for laterally shifting said scale across the optical path of the viewing means, said drum being calibrated so that a partial turn of the drum will shift the scale one scale division whereby the refractive index of the sample placed in contact with the refracting surface may be read directly from the scale.

No references cited.